United States Patent
Cottron et al.

(10) Patent No.: US 11,644,557 B2
(45) Date of Patent: May 9, 2023

(54) METHOD FOR CREATING A LEAST ONE VIRTUAL RECEPTION CHANNEL USING A RADAR ANTENNA AND RADAR SYSTEM

(71) Applicant: THALES, Courbevoie (FR)

(72) Inventors: Rodolphe Cottron, Merignac (FR); Philippe Goy, Merignac (FR); Patrick Garrec, Merignac (FR)

(73) Assignee: THALES, Courbevoie (FR)

( * ) Notice: Subject to any disclaimer, the term of this patent is extended or adjusted under 35 U.S.C. 154(b) by 447 days.

(21) Appl. No.: 16/685,585

(22) Filed: Nov. 15, 2019

(65) Prior Publication Data

US 2020/0158847 A1 May 21, 2020

(30) Foreign Application Priority Data

Nov. 15, 2018 (FR) ...................................... 1871846

(51) Int. Cl.
*G01S 13/28* (2006.01)
*G01S 13/933* (2020.01)
(Continued)

(52) U.S. Cl.
CPC ............ *G01S 13/282* (2013.01); *G01S 13/24* (2013.01); *G01S 13/288* (2013.01); *G01S 13/30* (2013.01);
(Continued)

(58) Field of Classification Search
CPC ...... G01S 13/282; G01S 13/933; G01S 13/24; G01S 13/288; G01S 13/30; G01S 13/87; G01S 13/90; G06T 19/006
See application file for complete search history.

(56) References Cited

U.S. PATENT DOCUMENTS

| | | | | |
|---|---|---|---|---|
| 4,566,010 A * | 1/1986 | Collins | ................. | G01S 13/288 342/201 |
| 8,947,294 B1 * | 2/2015 | Wasiewicz | ............ | G01S 7/2813 342/162 |
| 2006/0273952 A1 * | 12/2006 | Krikorian | ............... | G01S 7/038 342/159 |
| 2010/0214152 A1 * | 8/2010 | Huang | .................. | G01S 13/288 342/120 |

(Continued)

FOREIGN PATENT DOCUMENTS

EP    1 522 871 A1    4/2005
EP    2 816 369 A1    12/2014

OTHER PUBLICATIONS

Chiu, S., & Dragošević, M. V. (2009). Moving target indication via radarsat-2 multichannel Synthetic Aperture Radar Processing. EURASIP Journal on Advances in Signal Processing, 2010(1) (Year: 2009).*

(Continued)

*Primary Examiner* — Erin F Heard
*Assistant Examiner* — Hailey R Le
(74) *Attorney, Agent, or Firm* — BakerHostetler (57) ABSTRACT

A method for creating a virtual reception channel in a radar system includes an antenna possessing two physical reception channels ($1_r$, $2_r$) spaced apart by a distance d in a direction x, two emission channels ($1_e$, $2_e$) spaced apart by the same distance d in the same direction x and processing means, the method comprising: dynamically selecting two different waveforms, the waveforms being orthogonal to each other; generating a radar pulse of given central wavelength in each emission channel, each of the emission channels emitting one of the two different waveforms; acquiring with the reception channels echoes due to pulses emitted by the emission channels and reflected by at least one target; compressing the pulses by matched filtering of the echoes acquired by each physical reception channel, this involving correlating them with each of the waveforms generated in the emission channel; and repeating steps a) to c) while randomly changing one of the values of each of the phase codes associated with the generated waveforms until (Continued)

the level of the sidelobes of all the compressed pulses has stabilized; and radar system for implementing such a method.

8 Claims, 6 Drawing Sheets

(51) Int. Cl.
*G01S 13/24* (2006.01)
*G01S 13/30* (2006.01)
*G01S 13/87* (2006.01)
*G01S 13/90* (2006.01)
*G06T 19/00* (2011.01)

(52) U.S. Cl.
CPC .............. *G01S 13/87* (2013.01); *G01S 13/90* (2013.01); *G01S 13/933* (2020.01); *G06T 19/006* (2013.01)

(56) References Cited

U.S. PATENT DOCUMENTS

| | | | | |
|---|---|---|---|---|
| 2010/0323652 | A1* | 12/2010 | Visser | ................... H04R 3/005 |
| | | | | 455/232.1 |
| 2010/0328157 | A1 | 12/2010 | Culkin et al. | |
| 2011/0163912 | A1* | 7/2011 | Ranney | ................... G01S 7/414 |
| | | | | 342/179 |
| 2018/0149735 | A1* | 5/2018 | Lim | ........................ G01S 13/42 |
| 2018/0262272 | A1* | 9/2018 | Ashrafi | ................... H04L 63/06 |
| 2020/0049812 | A1* | 2/2020 | Jansen | ................... G01S 7/358 |

OTHER PUBLICATIONS

Wang, L.-B., Wang, D.-W., Li, J.-J., Xu, J., Xie, C., & Wang, L. (May 26, 2016). Ground moving target detection and imaging using a virtual multichannel scheme in HRWS mode. IEEE Xplore. (Year: 2016).*

* cited by examiner

METHOD FOR CREATING A LEAST ONE VIRTUAL RECEPTION CHANNEL USING A RADAR ANTENNA AND RADAR SYSTEM

CROSS-REFERENCE TO RELATED APPLICATIONS

This application claims priority to foreign French patent application No. FR 1871846, filed on Nov. 15, 2018, the disclosure of which is incorporated by reference in its entirety.

FIELD OF THE INVENTION

The invention relates to the field of radar detection.
More particularly, the invention relates to the field of radar detection with airborne radar carried by helicopters, aircraft and surveillance aeroplanes.

BACKGROUND

Modern airborne radars must detect targets in the presence of parasitic echoes and electronic jamming. Echoes from the ground may occur at any angle and distance, and in addition have a Doppler shift caused by the movement of the carrier of the radar.

Space-time adaptive processing (STAP), which is known to those skilled in the art, is a technique for computationally processing the echoes of a number of coherent pulses transmitted by a phased-array antenna. This method allows a target moving at low speed hidden in radar clutter or in noise due to electronic jamming to be detected. To this end, it uses an approach that analyses spatial and temporal variations in the echoes, but that requires a plurality of reception channels to be used.

The use of two reception channels only allows ground clutter to be filtered or localized but does not allow these two processing operations to be carried out simultaneously or sequentially. In the case where the target of interest is located at an altitude equal to or lower than the altitude of the radar, detection and localization using the STAP method requires at least 3 reception channels on the vertical axis. For reasons of bulk and of overall cost of the radar, working with an antenna possessing 3 emission channels is constraining.

SUMMARY OF THE INVENTION

The invention aims to mitigate the aforementioned problem, i.e. to carry out STAP processing using an antenna that is less bulky and less expensive. To this end, one subject of the invention is a method such as described in the claims. Another subject of the invention is a system implementing this method.

Thus, one subject of the invention is a method for creating a virtual reception channel in a radar system comprising an antenna possessing two physical reception channels ($1_r$, $2_r$) spaced apart by a distance d in a direction x, two emission channels ($1_e$, $2_e$) spaced apart by the same distance d in the same direction x and processing means, the method comprising:
 a. dynamically selecting two different waveforms containing random noise taking the form of a random succession or code of phase values, said waveforms being orthogonal to each other;
 b. generating a radar pulse of given central wavelength in each emission channel, each of the emission channels emitting one of said two different waveforms;
 c. acquiring with the reception channels echoes due to pulses emitted by the emission channels and reflected by at least one target;
 d. compressing the pulses by matched filtering of the echoes acquired by each physical reception channel, this involving correlating them with each of the waveforms generated in the emission channels; and
 e. repeating steps a) to c) while randomly changing one of the values of each of the phase codes associated with the generated waveforms until the level of the sidelobes of all the compressed pulses has stabilized.

According to particular embodiments of such a method:
in each emission channel a waveform containing random noise taking the form of a random succession or code of phase values is generated.
the random code of the phase of the waveforms is binary.
the random code of the phase of the waveforms may take at least 3 values.
steps a) to c) are repeated while randomly changing one of the values of each of the phase codes associated with the generated waveforms until the level of the sidelobes of all the compressed pulses has stabilized.
 Doppler or post-integration processing is carried out along the axis of the recurrences while changing the phase codes so as to decrease the level of their sidelobes.
the level of the sidelobes of the compressed pulses is optimized by Weiner filtering.

Another subject of the invention is a radar system for implementing a method for creating a virtual reception channel comprising an antenna possessing two physical reception channels ($1_r$, $2_r$) spaced apart by a distance d in a direction x, two emission channels ($1_e$, $2_e$) spaced apart by the same distance d in the same direction x and processing means, characterized in that said radar system is configured so that, in each emission channel, radio pulses of given central wavelength are generated, each of the emission channels emitting different waveforms containing random noise taking the form of a random succession or code of phase values, which are chosen dynamically, said waveforms being orthogonal to the waveforms of the pulses emitted by the other emission channel, the processing means being suitable for compressing by matched filtering the pulses of echoes acquired by each physical reception channel, this involving correlating them with each of the waveforms generated in the emission channels, each of the emission channels furthermore being configured to randomly change one of the values of each of the phase codes associated with the generated waveforms until the level of the sidelobes of all the compressed pulses has stabilized.

According to particular embodiments of such a system:
the emission and reception channels are co-localized.
each of the emission channels comprises a waveform generator that generates the orthogonal waveforms, a mixer that mixes a signal delivered by a local oscillator and a signal delivered by the waveform generator, and an amplifier that amplifies the signal delivered by the mixer, the amplified signal allowing radar pulses to be emitted by the antenna via a circulator allowing the antenna to operate in emission and reception, and each of the n reception channels comprises an amplifier that amplifies the signal received by the reception channel, a mixer that mixes a signal delivered by a local oscillator and the signal delivered by the amplifier of the reception channel, and an amplitude-phase demodulator/analogue-digital converter that allows the processing means to digitally compress the pulses by matched filtering.

BRIEF DESCRIPTION OF THE DRAWINGS

Other features, details and advantages of the invention will become more clearly apparent on reading the description, which is given with reference to the appended drawings, which are given by way of example and show, respectively.

In the figures, identical references have been used to reference elements that are the same.

In the figures, unless otherwise indicated, the elements are not to scale.

DETAILED DESCRIPTION

Figure 1:
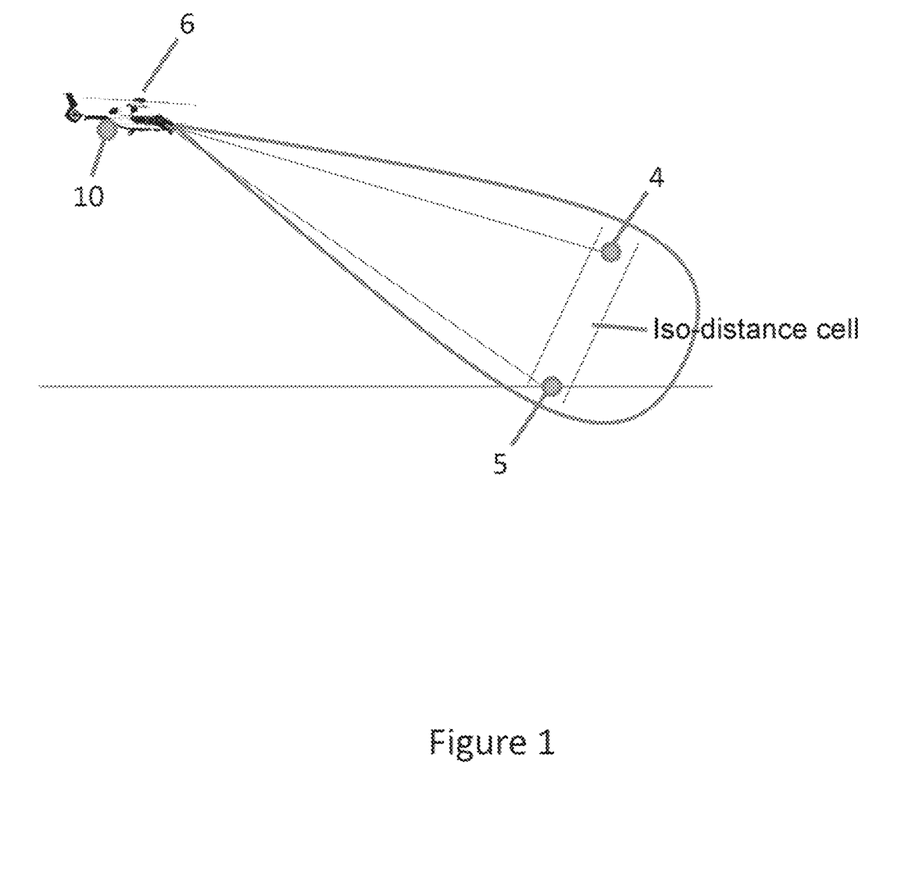
FIG. 1, a schematic of the technical problem to be solved.

FIG. 1 illustrates the technical problem to be solved. It is sought to detect and localize targets 4 of low RCS using an airborne radar system 10 carried by a helicopter 6 or surveillance aeroplane.

The constraining configuration is the configuration in which the target of interest is located at an altitude equal to or lower than the altitude of the radar, the target possibly being an aircraft, a drone or a high-voltage cable. Specifically, the target is then not located on thermal noise in a distance-velocity detection map, this type of map being known to those skilled in the art, but is hidden in the clutter due to the ground 5 located at the same radial distance as the target, i.e. the power of the target is lower than the power of the clutter or at best of the same order of magnitude. As indicated above, one problem to be solved is that of how to achieve detection and localization using an antenna having only two hardware receptions channels on the vertical axis, with a view in particular to meeting constraints on the overall cost of the radar but also constraints on bulk.

In order in particular to relax economical and bulk constraints related to the use of a radar system possessing an antenna requiring at least 3 emission channels in one direction, the invention creates at least one virtual reception channel.

Figure 2A:
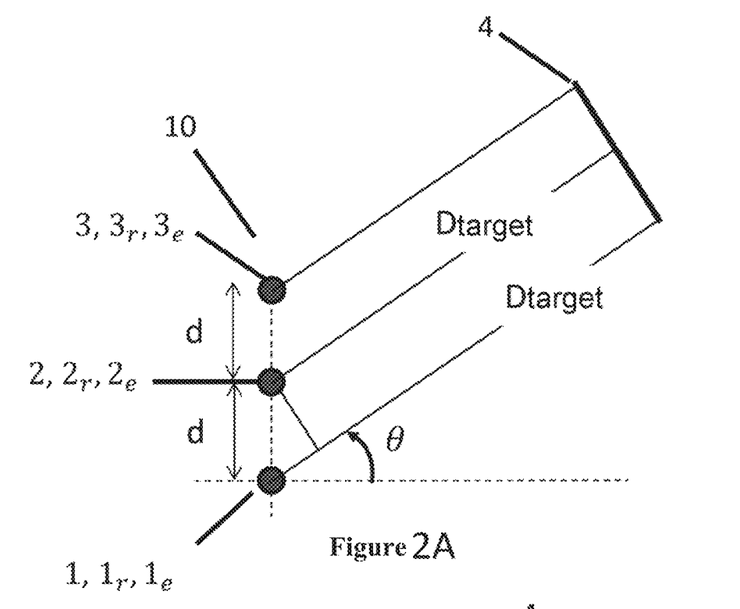
FIG. 2A, a schematic of the geometry of a known prior-art radar system and of a target of interest.
Figure 2B:
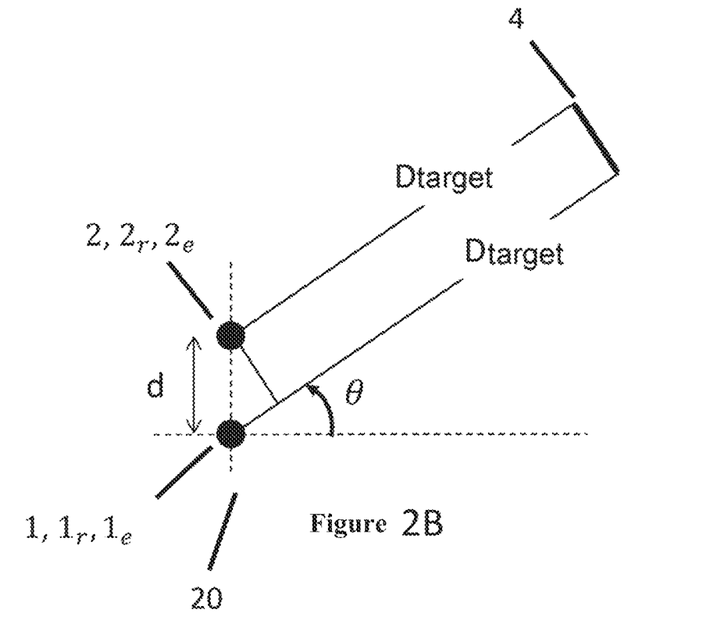
FIG. 2B, a schematic of the geometry of a radar system according to one embodiment of the invention and of a target of interest.

FIG. 2B schematically shows an airborne radar system 20 carried by a helicopter seeking a target of interest 4 hidden in ground clutter. In another example application, this system may be carried by an aeroplane, or any other type of aerial carrier. The radar system 20 possesses two physical emission channels ($1_e$, $2_e$), two reception channels ($1_r$, $2_r$) and processing means (not shown) allowing the signals received by the reception channels to be extracted. In the embodiment of FIG. 2B, the phase centres (1, 2) of the reception and emission channels are coincident and spaced apart by a distance d in a vertical direction.

The two emission channels emit radar pulses at two wavelengths $\lambda 1$ and $\lambda 2$ and the distance $D_{target}$ between the radar system and a target of interest 4 observed with an angle $\theta$ is sufficient that the radar waves reflected by the target of interest may be considered to be plain on reception by the emission channels.

The phase of the received signals is then equal to:

TABLE 1

| Emission channel | Reception channel | Phase $\phi$ |
|---|---|---|
| $1_e$ | $1_r$ | $\frac{2\pi}{\lambda_1}(2*D_{target})$ |
| $1_e$ | $1_r$ | $\frac{2\pi}{\lambda_1}(2*D_{target} + d \cdot \sin\theta)$ |
| $2_e$ | $2_r$ | $\frac{2\pi}{\lambda_2}(2*D_{target} + d \cdot \sin\theta)$ |
| $2_e$ | $2_r$ | $\frac{2\pi}{\lambda_2}(2*D_{target} + 2 \cdot d \cdot \sin\theta)$ |

Taking as reference phase the phase received by $1_r$ and emitted by $1_e$, the relative phase $\Delta\phi$ is equal to:

TABLE 2

| Emission channel | Reception channel | Relative phase $\Delta\phi$ |
|---|---|---|
| $1_e$ | $1_r$ | 0 |
| $1_e$ | $1_r$ | $\frac{2\pi}{\lambda_1}d \cdot \sin\theta$ |
| $2_e$ | $2_r$ | $\frac{2\pi}{\lambda_2}d \cdot \sin\theta + 4\pi D_{target} \times \left(\frac{1}{\lambda_2} - \frac{1}{\lambda_1}\right)$ |
| $2_e$ | $2_r$ | $\frac{2\pi}{\lambda_2}2 \cdot d \cdot \sin\theta + 4\pi D_{target} \times \left(\frac{1}{\lambda_2} - \frac{1}{\lambda_1}\right)$ |

In the embodiment FIG. 2B, the wavelengths emitted by the two emission channels are identical and $\lambda 1 = \lambda 2 = \lambda$. Thus, once again taking as reference phase the phase received by $1_r$ and emitted by $1_e$, the relative phase $\Delta\phi$ is equal to:

TABLE 3

| Emission channel | Reception channel | Relative phase $\Delta\phi$ |
|---|---|---|
| $1_e$ | $1_r$ | 0 |
| $1_e$ | $1_r$ | $\frac{2\pi}{\lambda}d \cdot \sin\theta$ |
| $2_e$ | $2_r$ | $\frac{2\pi}{\lambda}d \cdot \sin\theta$ |
| $2_e$ | $2_r$ | $\frac{2\pi}{\lambda}2 \cdot d \cdot \sin\theta$ |

It will be noted that three independent relative phase values are obtained from 4 signals issued from the 4 possible combinations. In the embodiment of FIG. 2B, 3 independent relative-phase values are therefore obtained, said values being equal to the values of the known prior-art embodiment of FIG. 2A, in which the radar system possesses three physical reception channels ($1_r$, $2_r$, $3_r$) and 3 emission channels ($1_e$, $2_e$, $3_e$), with the phase centres (1, 2, 3) of the reception and emission channels coincident and spaced apart by a distance d in a vertical direction. Specifically, in the embodiment of FIG. 2A, the three emission channels emit radar pulses at the same wavelength By taking as phase reference the phase received by $1_r$ and emitted by $1_e$ the relative phase values $\Delta\phi$ are therefore:

TABLE 4

| Emission channel | Reception channel | Relative phase $\Delta\phi$ |
|---|---|---|
| $1_e$ | $1_r$ | 0 |
| $1_e$ | $2_r$ | $\frac{2\pi}{\lambda} d \cdot \sin\theta$ |
| $1_e$ | $3_r$ | $\frac{2\pi}{\lambda} 2d \cdot \sin\theta$ |

Thus, the embodiment of FIG. 2B allows an antenna with three reception channels (two real and one virtual) of double length to be created virtually from an antenna of single length physically comprising only two reception channels and two emission channels. The virtual reception channel possesses a phase centre aligned in the same vertical direction and separated by a distance d from the reception channel $2_r$ and $2d$ from the reception channel $1_r$. Thus, with the radar system 20 of the embodiment of FIG. 2B, it is theoretically possible to carry out STAP processing in order to localize and detect targets of small RCS and/or that are hidden in ground clutter.

However, the creation of a virtual reception channel from two physical reception channels assumes that the two emitters operate at the same wavelength.

In addition, it assumes that the two emission channels emit their signals at the same time and therefore that the reception channels will receive the signals emitted by the two emitters simultaneously (plus or minus the relative phase). If the signals are identical and the same waveform is used by the 2 emitters, the signals cannot be separated after reception and processing. If it is impossible to determine via which emission channel a signal was emitted on reception of said signal after reflection, it is impossible to apply the reasoning given above and to thus create a virtual third reception channel from the 2 physical channels.

For this reason, in the embodiment of FIG. 2B, the waveforms emitted by each emission channel are orthogonal to the waveforms emitted by the other emission channels. Thus, after reception in the two reception channels of the echoes generated by the two emission channels, matched filtering makes it possible to keep the signal emitted by a single one of the emitters, the received signal originating from the other emitter being rejected.

Figure 3:
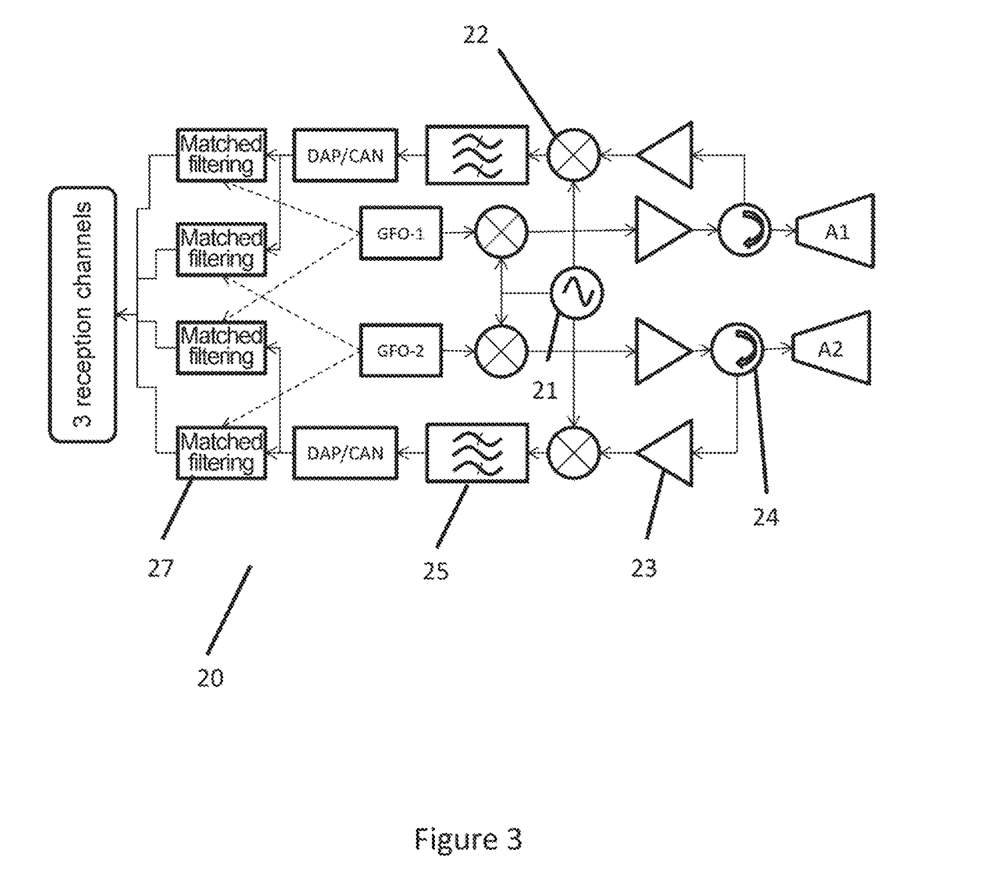
FIG. 3, a schematic of the radar system of the embodiment of FIG. 1.

A schematic of the radar system 20 is illustrated in FIG. 3. In this example embodiment, each of the emission channels $1_e$, $2_e$ possesses a waveform generator GFO-1, GFO-2, the waveforms generated by one generator being orthogonal to the waveforms emitted by the other. The emitted waveforms are recorded and will be reused in the matched filtering. These signals are used as carriers and are combined, via a mixer 22, with an input signal delivered by a local oscillator, in order to convert them into radar pulses at the central wavelength Each of the two radar signals then undergoes the type of processing that is conventionally carried out to emit radiofrequency waves. In the embodiment of FIG. 3, the signals are amplified by an amplifier 23, which is preferably a low-noise amplifier (LMA), then pass through a circulator 24 that makes it possible to prevent simultaneous emission and reception by the two antennas A1, A2. Lastly, the antennas A1 and A2 emit the radar pulses, the waveforms of the pulses emitted by an antenna therefore being orthogonal to the waveforms emitted by the other antenna.

The two antennas A1, A2 receive the echoes of the radar pulses emitted by the two emission channels and reflected by a target. In each of the two physical reception channels, these radar pulses undergo the type of processing that is conventionally carried out to receive and digitize radiofrequency waves. In the embodiment of FIG. 3, the pulses are amplified by an amplifier then demodulated by the same local oscillator 21 using a mixer, then filtered by an intermediate-frequency filter 25 and lastly digitized using an amplitude-phase demodulator/analogue-digital converter (DAP/CAN). In each of the two reception channels, by virtue of the processing means 26, the digitized pulses are compressed by matched filtering, this involving correlating them with each of the waveforms generated in the emission channels, then recorded. Thus, one correlation peak is obtained for each distance box in which an echo is located.

The signal received by each reception channel is a summation of the echoes generated by the signals emitted by the 2 emission channels. Since the waveforms emitted by each of the emission channels are orthogonal, the correlation of the echoes due to emitter $1_e$ with the waveform of the pulse emitted by emitter $2_e$ is thus negligible. The same goes for the correlation of the echoes due to emitter $2_e$ with the waveform of the pulse emitted by emitter $1_e$. These pulses are therefore "rejected" by the matched filtering. In contrast, the correlation of the echoes due to emitter $1_e$ (emitter $2_e$, respectively) with the waveform of the pulse emitted by emitter $1_e$ (emitter $2_e$, respectively) will be maximal.

In each of the two reception channels, filtering that is matched to each of the two emitted pulses is therefore applied to the digitized signal. Therefore four signals are obtained, three of which are independent (see Table 3), which signals allow three equivalent reception channels to be formed.

All of the emitting and receiving steps described with reference to the embodiment of FIG. 3 may be carried out using various techniques known to those skilled in the art.

In the embodiment of FIG. 2B and FIG. 3, the signals emitted by each of the emission channels possess waveforms containing random noise taking the form of a random succession or code of phase values.

In other embodiments, any type of orthogonal waveform other than noise-containing waveforms may be used, provided that the emitted signals possess the same central wavelength.

Let the distance resolution of the radar system 20 allowing the echoes to be separated in radial distance be denoted $r_d$. The band to be emitted in order to obtain this resolution is denoted B (with $r_d=c/(2B)$) and the duration of the pulse to be emitted in order to obtain the form factor that is optimal for the radar is denoted $\tau$.

In the embodiment of FIG. 2B, the emitted pulses consist of $N=B\times\tau$ points of random phase values equalling 0 or $\pi$. This allows a signal of band B to be obtained as expected. The emitted successions are recorded and used to perform the pulse compression by matched filtering of the digitized signals corresponding to the echoes generated by the signals emitted by the 2 emission channels.

Figure 4:
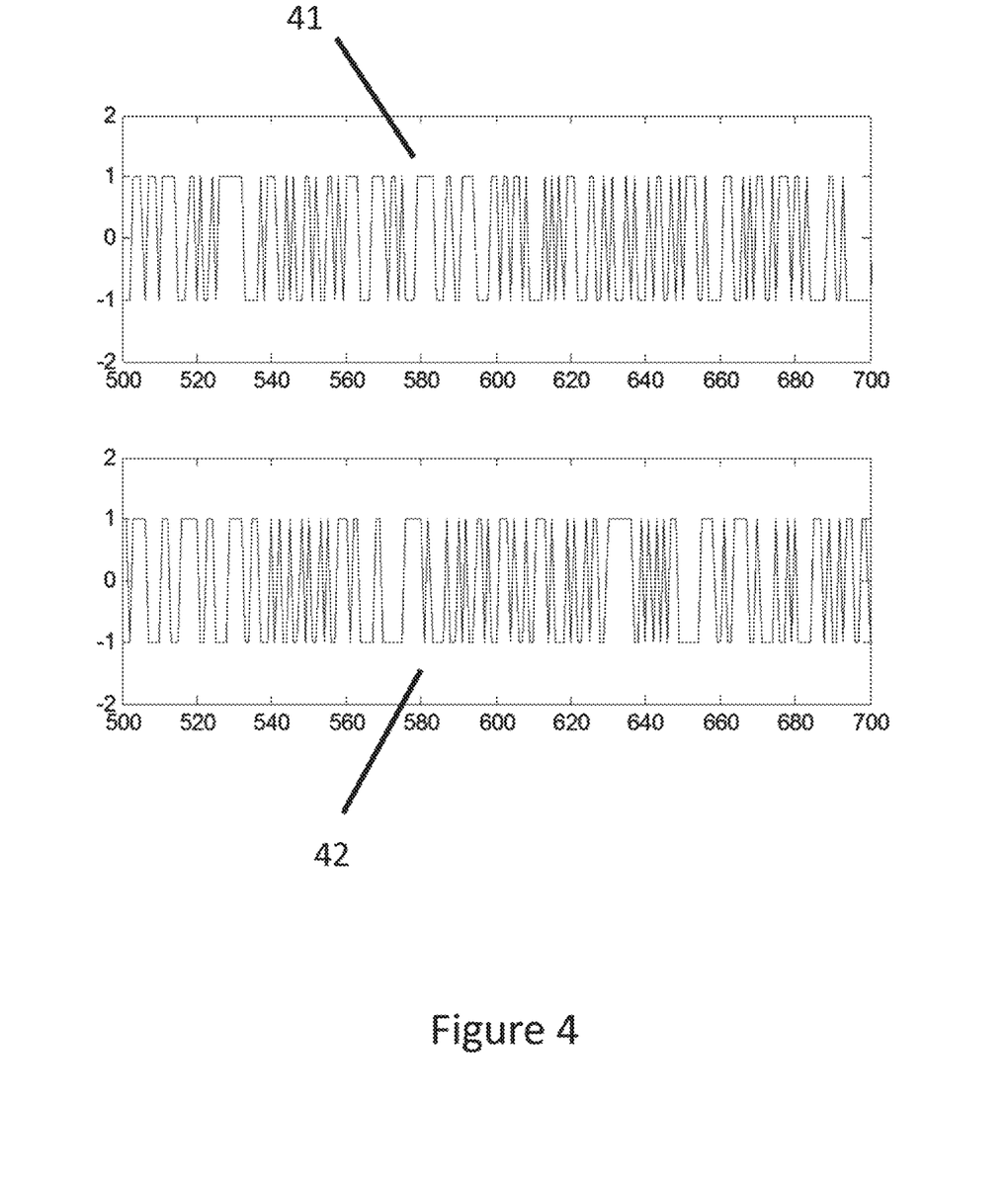
FIG. 4, two waveforms emitted by the radar system of the embodiment of FIG. 1.

FIG. 4 illustrates two examples of enlarged random successions of phase values 41 and 42 for pulses emitted by each of the two emission channels of the radar system 20. The x-axis represents distance-box number and the y-axis the value of the phase code. In this embodiment, the emission band B is equal to 50 MHz and the duration r of the pulses is equal to 50 μs.

Figure 5A:
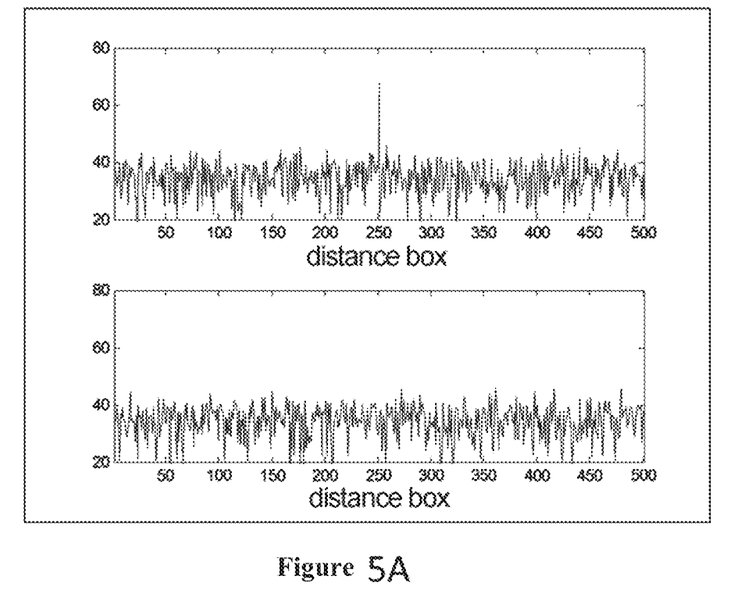
FIGS. 5A and 5B, pulses after matched filtering with one and two active emission channels, respectively FIGS. 6A, 6B and 6C, the levels of the sidelobes of a pulse after matched filtering without optimization, with optimization of the random code and with optimization by processing along the axis of the recurrences, respectively.
Figure 5B:
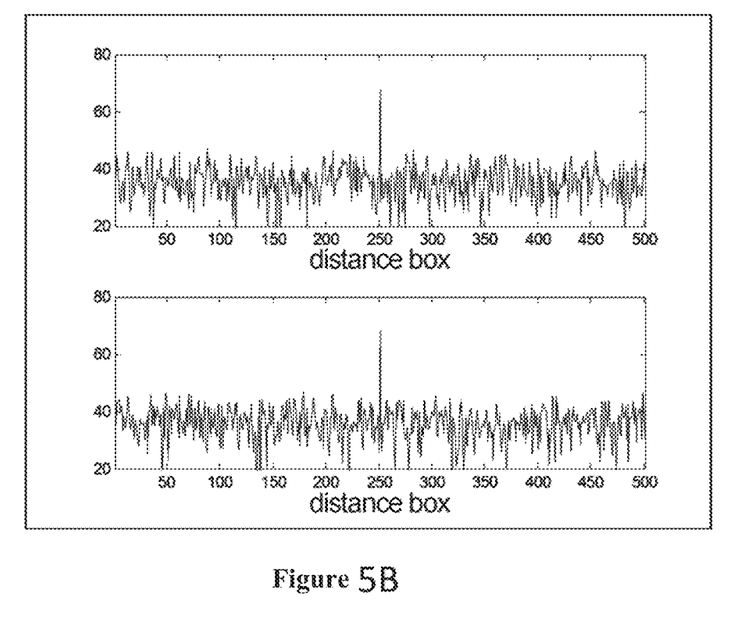

FIGS. 5A and 5B show two impulse responses 5A and 5B of pulse compressions by matched filtering in two different cases with waveforms containing similar random noise to the pulses of FIG. 4. The x-axis represents the distance-box number and the y-axis the level in dB. In FIGS. 5A and 5B, the top graph corresponds to filtering matched to the signal emitted by emission channel $1_e$ of an echo received by reception channel $1_r$, and the bottom graph corresponds to filtering matched to the signal emitted by emission channel $2_e$ of an echo received by reception channel $1_r$. In FIGS. 5A and 5B the echoes are simulated with a signal-to-noise ratio SNR=0 dB and are due to a target located at the box distance 250 of the radar system.

In FIG. 5A, only the emission channel $1_e$ emits a pulse. By carrying out filtering matched to the signal emitted by the emission channel $1_e$ of an echo received by reception channel $1_r$ (FIG. 5A top graph), the correlation peak in distance box 250 is observed in the compressed signal. It may therefore be seen that the thermal noise level is sufficiently low to clearly observe the correlation peak. The correlation peak is about 30 dB above the thermal noise level. Obviously, since no pulse is emitted by emission channel $2_e$, the filtering matched to the signal emitted by emission channel $2_e$ of an echo received by reception channel $1_r$ gives no correlation peak (FIG. 5A, bottom graph).

In FIG. 5B, the two emission channels $1_e$ and $2_e$ are active and each emit a pulse. Thus, it may be seen that the two filtering operations matched to the two signals emitted by the two emission channels $1_e$, $2_e$ of the echoes received by reception channel $1_r$ both yield correlation peaks in the distance box 250.

By carrying out two filtering operations matched to the two signals emitted by the two emission channels $1_e$, $2_e$ of the echoes received by reception channel $2_r$, four signals are therefore obtained, two of which are not independent, allowing in the end three independent reception channels to be formed. Thus, in the embodiment of FIGS. 2A-2B, it is possible to carry out STAP processing using these three independent channels and thus to detect and localize a target of interest hidden in ground clutter.

The method for creating a virtual third reception channel on the vertical axis of the radar system 20 comprises:

generating waveforms containing random noise taking the form of a random succession or code of phase values of 0 or π, said waveforms being orthogonal to one another;

generating a radar pulse of given central wavelength in each emission channel, each of the emission channels emitting one of the different waveforms;

compressing the pulses by matched filtering of the echoes acquired by each physical reception channel, this involving correlating them with each of the waveforms generated in the emission channels.

Figure 6A:
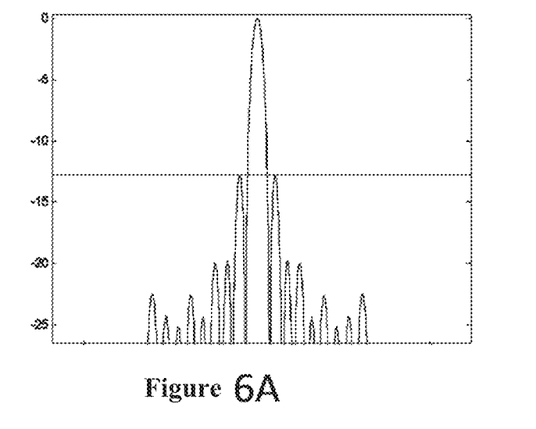

Without processing, the level of the sidelobes of the correlation peaks obtained after matched filtering of the various echoes is high, which may prove to be disadvantageous for the detection of targets that are close to one another or that have different RCS. FIG. 6A shows an enlargement of the impulse response in an embodiment in which the radar system 20 emits pulses of emission band B=50 MHz and of pulse duration τ=50 μs possessing waveforms containing random noise similar to the pulses of FIG. 4. In this embodiment, the level of the sidelobes is −13 dBc.

In one embodiment, the level of the sidelobes of the correlation peaks is decreased by optimizing the random succession of phase values. To do this, one value of the succession of phase values is randomly modified, then:

If the level of the sidelobes is not decreased, the succession of phase values before modification is preserved; or If the level of the sidelobes has decreased, the new succession of phase values is preserved and the process is repeated by once again randomly modifying a value of the succession of phase values and observing the level of the sidelobes.

This process is repeated until the level of the sidelobes has stabilized, this in general occurring after several thousand iterations (i.e. a few minutes).

Figure 6B:
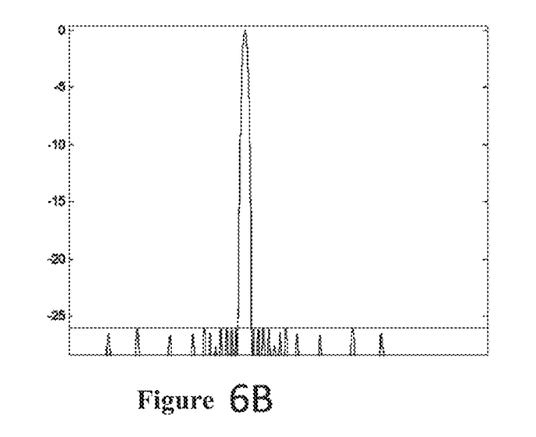

FIG. 6B shows the result of this iterative process in the same embodiment as that of FIG. 6A, one value of the phase-code succession having been iteratively modified from 0 to π or from π to 0. In this embodiment, the level of the sidelobes has decreased to −26 dBc.

In another embodiment, the level of the sidelobes is decreased using a Weiner filter. This type of filter allows the level of the spectrum in the useful band to be normalized and may be weighted in order to control the level of the sidelobes of the correlation peak. In this case, the level of the sidelobes depends only on the weighting coefficients chosen by the user.

In another embodiment, the level of the sidelobes is decreased by changing the succession of phase values between each recurrence. Carrying out coherent Doppler or post-integration processing along the axis of the recurrences allows a coherent gain to be obtained, i.e. a gain in the level of the main peak, i.e. the peak due to the target, with respect to the level of the side peaks. Specifically, by changing the succession of phase values between each recurrence, the level of the correlation peaks remains unchanged while the level of the side peaks varies from one recurrence to the next. Thus, the level of the sidelobes will be decreased by the value of the gain of this processing.

Figure 6C:
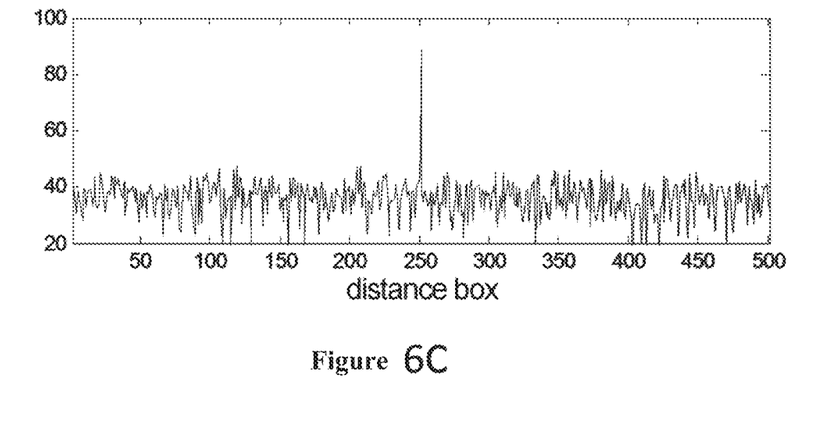

FIG. 6C shows the result obtained after pulse compression with change of code on each recurrence and Doppler processing over 128 recurrences in the same embodiment as that of FIG. 6A. The level of the correlation peak corresponding to the target is unchanged but the level of the noise has decreased by 21 dB, which corresponds to the gain of the Doppler processing.

In another embodiment, the emission and reception channels are aligned along a horizontal axis. Thus, with the same method of using a radar system as that described above it is possible to create a least one virtual reception channel on the horizontal axis.

In another embodiment, the succession of random phase values with which the noise-containing waveforms are generated is coded using values of 0 and 2π. In another embodiment, the succession of phase values with which the noise-containing waveforms are generated is coded with a polyphase code, the succession being adapted so that the waveforms emitted by one emission channel are orthogonal to those emitted by the other emission channel.

In another embodiment, the compression by matched filtering is not carried out using the theoretical succession of phase values generated by the waveform generators but rather a succession calibrated beforehand. To do this, the emitted signal is directly reinjected into the reception channels and recorded at the output of the DAP/CAN in order to serve as matched filter during the compression of the pulses acquired by the reception channels. This step of calibrating the succession/waveform makes it possible to avoid distortions related to the emission/reception chain and thus maximize the effectiveness of the matched filtering.

In another embodiment, the two reception channels and the two emission channels are not co-localized (placed in the same location) but they are rather each spaced apart by the same distance d.

In another embodiment, the emission and reception channels are aligned along a horizontal axis. Thus, with the same method of using a radar system as that described above it is possible to create at least one virtual reception channel on the horizontal axis.

The invention claimed is:

1. A method for creating a virtual reception channel in a radar system comprising an antenna possessing two physical reception channels ($1_r$, $2_r$) spaced apart by a distance d in a direction x, two emission channels ($1_e$, $2_e$) spaced apart by the same distance d in the same direction x and processing means, the method comprising:
   a. selecting two different waveforms containing random noise taking the form of a random succession or code of phase values, said waveforms being orthogonal to each other;
   b. generating a radar pulse of given central wavelength in each emission channel, each of the emission channels emitting one of said two different waveforms;
   c. acquiring with the reception channels echoes due to pulses emitted by the emission channels and reflected by at least one target;
   d. compressing the pulses by matched filtering of the echoes acquired by each physical reception channel, this involving correlating them with each of the waveforms generated in the emission channels; and
   e. repeating steps a) to c) while randomly changing one of the values of each of the phase codes associated with the generated waveforms until the level of the sidelobes of all the compressed pulses has stabilized.

2. The method for creating a virtual reception channel according to claim 1, wherein the random code of the phase of the waveforms is binary.

3. The method for creating a virtual reception channel according to claim 1, wherein the random code of the phase of the waveforms may take at least 3 values.

4. The method for creating a virtual reception channel according to claim 1, wherein Doppler or post-integration processing is carried out along the axis of recurrences while changing the phase codes so as to decrease the level of their sidelobes.

5. The method for creating a virtual reception channel according to claim 1, wherein the level of the sidelobes of the compressed pulses is optimized by Wiener filtering.

6. A radar system for implementing a method for creating a virtual reception channel comprising an antenna possessing two physical reception channels ($1_r$, $2_r$) spaced apart by a distance d in a direction x, two emission channels ($1_e$, $2_e$) spaced apart by the same distance d in the same direction x and processing means, wherein said radar system is configured so that, in each emission channel, radio pulses of given central wavelength are generated, each of the emission channels emitting different waveforms containing random noise taking the form of a random succession or code of phase values, said waveforms being orthogonal to the waveforms of the pulses emitted by the other emission channel, the processing means being suitable for compressing by matched filtering the pulses of echoes acquired by each physical reception channel, this involving correlating them with each of the waveforms generated in the emission channels, each of the emission channels furthermore being configured to randomly change one of the values of each of the phase codes associated with the generated waveforms until the level of the sidelobes of all the compressed pulses has stabilized.

7. The radar system according to claim 6, wherein the emission and reception channels are co-localized.

8. The radar system according to claim 6, wherein each of the emission channels comprises a waveform generator (GFO-1, GFO-2) that generates the orthogonal waveforms, a mixer that mixes a signal delivered by a local oscillator and a signal delivered by the waveform generator, and an amplifier that amplifies the signal delivered by the mixer, the amplified signal allowing radar pulses to be emitted by the antenna via a circulator allowing the antenna to operate in emission and reception, and each of the n reception channels comprises an amplifier that amplifies the signal received by the reception channel, a mixer that mixes a signal delivered by a local oscillator and the signal delivered by the amplifier of the reception channel, and an amplitude-phase demodulator/analogue-digital converter (DAP/CAN) that allows the processing means to digitally compress the pulses by matched filtering.

* * * * *